J. WERNER, Jr.
Harvesters.

No. 139,986. Patented June 17, 1873.

Witnesses: Inventor:
J. Werner, Jr.
Per
Attorneys.

UNITED STATES PATENT OFFICE.

JOHN WERNER, JR., OF PRAIRIE DU SAC, WISCONSIN.

IMPROVEMENT IN HARVESTERS.

Specification forming part of Letters Patent No. 139,986, dated June 17, 1873; application filed March 15, 1873.

*To all whom it may concern:*

Figure 1:
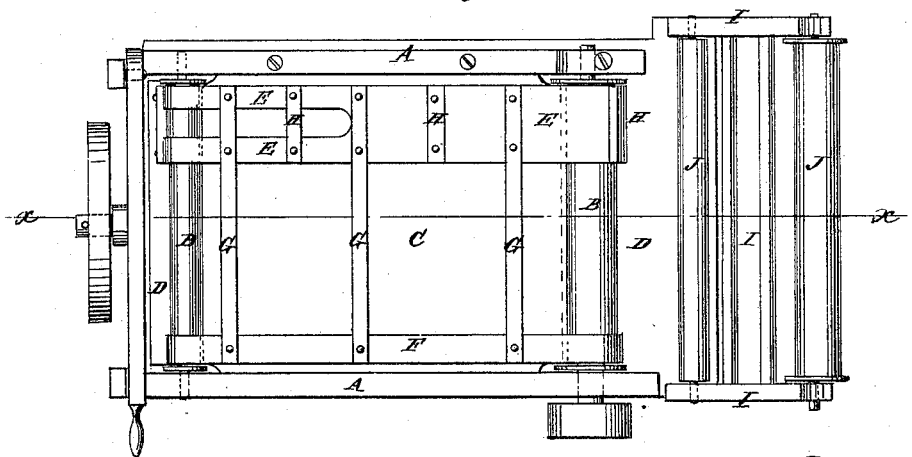
Figure 2:
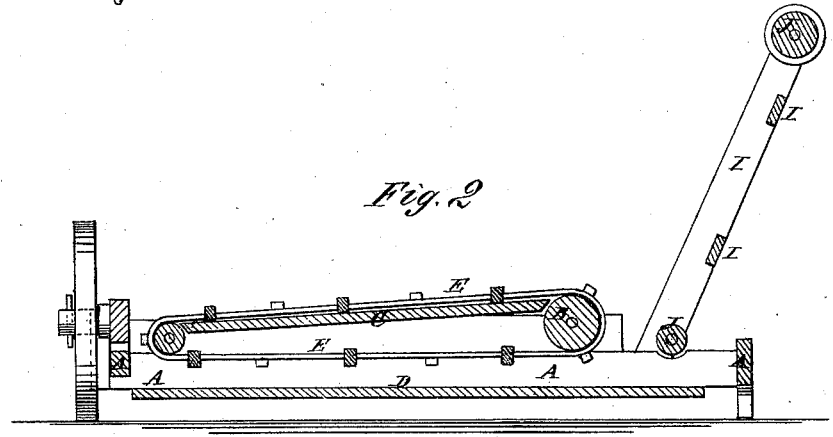

Be it known that I, JOHN WERNER, Jr., of Prairie du Sac, in the county of Sauk and State of Wisconsin, have invented a new and useful Improvement in Grain-Conveying Harvester-Platform, of which the following is a specification:

Figure 1 is a top view of my improved harvester-platform. Fig. 2 is a detail longitudinal section of the same, taken through the line $x\ x$, Fig. 1.

Similar letters of reference indicate corresponding parts.

My invention has for its object to improve the construction of that class of harvester-platforms that convey the grain longitudinally along the platform, and raise it into a receptacle whence it may be conveniently taken by the binders and bound. The invention consists in the improvement of platform-conveyers, as hereinafter fully described and pointed out in the claim.

A represents the frame-work of the harvester-platform, to which, near its ends, are pivoted two rollers, B, around which the conveyer passes. To the frame A, between the rollers B, is secured a platform, C, which is so arranged as to be level with the tops of the rollers B, so that the upper part of the conveyer may slide along it. To the frame A is also attached a platform, D, in such a position as to leave a space between said platforms, D and C, for the lower part of the conveyer to pass through. The conveyer is formed by passing two or three belts, E F, around the rollers B, and attaching to them cross-bars or slats G H. The belt E, which may be two narrow belts or a single wide one, passes around the rollers B at their forward ends, and the belt F, which is a single narrow one, passes around the rear ends of said rollers B. G are long cross-slats which are attached to the belts E F, and the parts of which that come in contact with the said belts are rabbeted for the thickness of said belts, so that their lower sides may come in contact with and slide along the platform C. The slats H are short, extending only across the belt or belts F. I is the elevator-frame, which is attached to the frame A, and to it are pivoted the rollers J, around which passes the elevator to raise the grain and deposit it in a receiver for binding.

When the cut grain falls upon a harvester-platform it usually falls with its heads inclined toward the elevator, and is carried forward in that position to said elevator, when an ordinary conveyer is used. With my improved conveyer the heads of the cut grain fall upon the platform C, and its butts upon the belt or belts E, so that the said heads will lie still, and the butts will be carried forward until the grain lies straight across the platform, when it will be carried forward by the slats G to the elevator.

Having thus described my invention, I claim as new and desire to secure by Letters Patent—

The belts E F connected by cross-bars G H, and combined with a continuously-close platform C, level with the tops of and extending to each of the rolls B B, as and for the purpose described.

JOHN WERNER, JR.

Witnesses:
JAMES WERNER,
THOMAS BAKER.